United States Patent
Wang et al.

(10) Patent No.: US 11,526,460 B1
(45) Date of Patent: Dec. 13, 2022

(54) MULTI-CHIP PROCESSING SYSTEM AND METHOD FOR ADDING ROUTING PATH INFORMATION INTO HEADERS OF PACKETS

(71) Applicant: Shanghai Zhaoxin Semiconductor Co., Ltd., Shanghai (CN)

(72) Inventors: Weilin Wang, Beijing (CN); Xiaoliang Kang, Xi'an (CN); Shuai Zhang, Beijing (CN); Yang Shi, Beijing (CN); Yongfeng Song, Beijing (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/511,800

(22) Filed: Oct. 27, 2021

(30) Foreign Application Priority Data

Sep. 28, 2021 (CN) .......................... 202111141627.5
Sep. 28, 2021 (CN) .......................... 202111142578.7
Sep. 28, 2021 (CN) .......................... 202111142579.1
Sep. 28, 2021 (CN) .......................... 202111142604.6

(51) Int. Cl.
*G06F 15/78* (2006.01)
*G06F 13/42* (2006.01)
(Continued)

(52) U.S. Cl.
CPC ...... *G06F 13/4265* (2013.01); *G06F 15/7807* (2013.01); *G06F 15/7825* (2013.01);
(Continued)

(58) Field of Classification Search
CPC .......................... G06F 15/7807; G06F 15/7825
See application file for complete search history.

(56) References Cited

U.S. PATENT DOCUMENTS

2010/0002589 A1*  1/2010  Ciordas ................. G06F 11/349
                                                    370/241
2010/0191894 A1*  7/2010  Bartley ............... G06F 13/1684
                                                    711/E12.082

(Continued)

OTHER PUBLICATIONS

Sergio Saponara, Luca Fanucci "Configurable network-on-chip router macrocells" Microprocessors and Microsystems 45, pp. 141-150 (Year: 2016).*

(Continued)

*Primary Examiner* — Jacob Petranek
(74) *Attorney, Agent, or Firm* — McClure, Qualey & Rodack, LLP

(57) ABSTRACT

Packet routing within a multi-chip processing system is shown. A first chip has a first interconnect bus, and a first microprocessor coupled to the first interconnect bus. The first interconnect bus has a first routing register. When the first microprocessor operates the first chip as a source node to output a packet to be transferred to a destination node, routing information indicating a routing path from the source node to the destination node is written into the first routing register and then loaded from the first routing register to a header of the packet. While being transferred within the multi-chip processing system from the source node to the destination node, the packet is guided along the routing path indicated in the routing information carried in the header of the packet.

19 Claims, 18 Drawing Sheets

(51) Int. Cl.
*H04L 45/02* (2022.01)
*H04L 45/00* (2022.01)
*H04L 45/745* (2022.01)
*H04L 45/42* (2022.01)

(52) U.S. Cl.
CPC .............. *H04L 45/02* (2013.01); *H04L 45/22* (2013.01); *H04L 45/42* (2013.01); *H04L 45/745* (2013.01)

(56) References Cited

U.S. PATENT DOCUMENTS

| | | | |
|---|---|---|---|
| 2014/0177473 A1* | 6/2014 | Kumar | H04L 45/58 370/255 |
| 2015/0263949 A1* | 9/2015 | Roch | H04L 45/34 370/392 |
| 2017/0060212 A1* | 3/2017 | Kaushal | G06F 1/3287 |
| 2017/0185449 A1* | 6/2017 | Zhang | G06F 12/0811 |
| 2020/0153757 A1* | 5/2020 | Bharadwaj | H04L 45/58 |
| 2021/0306257 A1* | 9/2021 | Dutta | H04L 45/741 |
| 2022/0019552 A1* | 1/2022 | Wilkinson | G06F 15/82 |
| 2022/0045948 A1* | 2/2022 | Shen | H04L 49/3009 |

OTHER PUBLICATIONS

Nan Wang, Pedro Valencia. "Traffic Allocation: An Efficient Adaptive Network-on-Chip Routing Algorithm Design" 2nd IEEE International Conference on Computer and Communications (Year: 2016).*

* cited by examiner

| | | |
|---|---|---|
| read from routing table by socket0 | (1102) | 32'b1_0_0_0111_00000000_00000000_00_00_01_01 |
| output by socket0 | (1104) | 32'b1_0_1_0101_00000000_00000000_00_00_01_01 |
| output by socket4 | (1106) | 32'b1_0_1_0011_00000000_00000000_00_01_01_01 |
| output by socket5 | (1108) | 32'b1_0_1_0001_00000000_00000000_00_00_01_01 |
| written into socket7 | (1110) | 32'b1_0_1_0001_00000000_00000000_00_00_01_01 |
| that socket7 returns to socket5 | (1112) | 32'b1_1_1_0011_00000000_00000000_00_00_01_01 |
| that socket5 returns to socket4 | (1114) | 32'b1_1_1_0101_00000000_00000000_00_00_01_01 |
| that socket4 returns to socket0 | (1116) | 32'b1_1_1_0111_00000000_00000000_00_00_01_01 |

FIG. 11

MULTI-CHIP PROCESSING SYSTEM AND METHOD FOR ADDING ROUTING PATH INFORMATION INTO HEADERS OF PACKETS

CROSS REFERENCE TO RELATED APPLICATIONS

This application claims priority of China Patent Application No. 202111142604.6 filed on Sep. 28, 2021, China Patent Application No. 202111142578.7 filed on Sep. 28, 2021, China Patent Application No. 202111141627.5 filed on Sep. 28, 2021, and China Patent Application No. 202111142579.1 filed on Sep. 28, 2021, the entirety of which are incorporated by reference herein.

BACKGROUND OF THE INVENTION

Field of the Invention

The present invention relates to a multi-chip processing system and, in particular, to a routing design between the multiple chips.

Description of the Related Art

Ethernet is a traditional communication technology that connects different servers.

A server network constructed using Ethernet can provide powerful computing capabilities, but can have long delays, poor system performance, and high costs.

The technical field needs a novel communication technology with low latency, high reliability, and high bandwidth utilization.

BRIEF SUMMARY OF THE INVENTION

The present invention discloses a multi-chip processing system that provides interconnect interfaces between chips and between sockets to form a system that can communicate with each other and achieve the desired flexibility in resource sharing. The present invention specifically discloses the packet routing within the multi-chip processing system.

A multi-chip processing system in accordance with an exemplary embodiment of the present invention includes a first chip that has a first interconnect bus and a first microprocessor coupled to the first interconnect bus. The first interconnect bus has a first routing register. When the first microprocessor operates the first chip as a source node to output a packet to be transferred to a destination node, routing information indicating a routing path from the source node to the destination node is written into the first routing register and then loaded from the first routing register to a header of the packet. While being transferred within the multi-chip processing system from the source node to the destination node, the packet is guided along the routing path indicated in the routing information carried in the header of the packet.

In an exemplary embodiment, the first interconnect bus has a storage space storing a routing table, and the routing table lists routing paths from the source node to the other nodes in the multi-chip processing system. In an exemplary embodiment, the routing table is burned into the first interconnect bus during manufacturing based on the preset architecture of the multi-chip processing system, which is fixed routing. In another exemplary embodiment, the routing table is established by scanning the real architecture of the multi-chip processing system when the multi-chip processing system is powered on; this routing is dynamically arranged. In another exemplary embodiment, the fixed routing and dynamically arranged routing are both provided, and a first bit of the routing information indicates whether the routing path indicated in the routing information is fixed or dynamically arranged.

In an exemplary embodiment, the routing information further indicates an effective bit number of the routing path indicated in the routing information. The effective bit number is modified along with a transfer of the packet within the multi-chip processing system to note transfer progress.

In an exemplary embodiment, when the packet that the first microprocessor operates the source node to output carries a request, the first microprocessor further evaluates whether a completion element corresponding to the request needs to be returned along the same route, and indicates the evaluated result in a second bit of the routing information. As indicated in the second bit of the routing information, the destination node determines whether to return the completion element to the source node along the same route.

In an exemplary embodiment, the routing path indicated in the routing information indicates the output port information of intermediate nodes. The output port information indicates that for each intermediate node an output port is determined by clockwise or counterclockwise counting starting from an input port. A third bit of the routing information indicates whether to adopt clockwise counting or counterclockwise counting. When identifying that the second bit of the routing information indicates returning the completion element to the source node along the same route, the destination node reverses the third bit of the routing information. The routing path indicated in the routing information further indicates the port number of the output port of the source node. The routing path indicated in the routing information further indicates the port number of the input port of the destination node.

In another exemplary embodiment, a method for packet routing within a multi-chip processing system is shown.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 11 takes the routing path from socket0 to socket4 to socket5 to socket7 in the three-dimensional interconnection structure of FIG. 3B as an example, to show the modifications made on the routing information along the routing path.

DETAILED DESCRIPTION OF THE INVENTION

The following description is made for the purpose of illustrating the general principles of the invention and should not be taken in a limiting sense. The scope of the invention is best determined by reference to the appended claims.

The present invention discloses a multi-chip processing system that provides interconnect interfaces between chips and between sockets to form a system that can communicate with each other and achieve the desired flexibility in resource sharing. The present invention specifically discloses the routing scheme between the different nodes in the system.

The present invention discloses high-performance interconnect interfaces, such as a socket-to-socket interconnect interface between sockets, or a die-to-die interconnect interface between dies on the same socket.

First, a socket-to-socket interconnect interface between the different sockets is introduced, which is named a ZPI interconnect interface in the following discussion.

Figure 1:
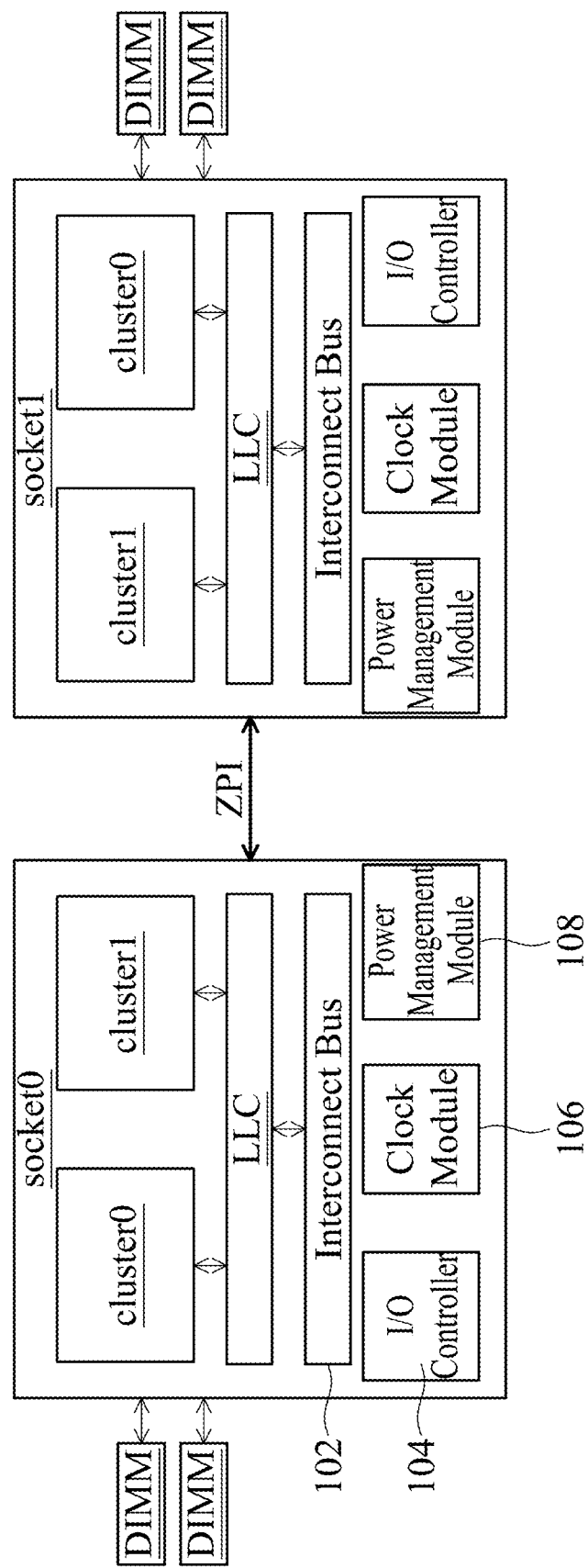
FIG. 1 depicts a socket-to-socket interconnect interface ZPI in accordance with an exemplary embodiment of the present invention.

FIG. 1 depicts a socket-to-socket interconnect interface ZPI in accordance with an exemplary embodiment of the present invention. Two sockets socket0 and socket1 are connected by a socket-to-socket interconnect interface ZPI (also labeled ZPI). In the example, each socket provides two clusters, labeled cluster0 and cluster1. There may have other numbers of clusters on one socket. Each cluster includes several central processing unit (CPU) cores. Each socket may have a last level cache LLC, an interconnect bus 102, and various components (such as an input/output controller 104, a clock module 106, a power management module 108, etc.). Each socket can be connected to dual in-line memory modules DIMM.

As connected through the socket-to-socket interconnect interface ZPI, the sockets socket0 and socket1 form a system. The CPU cores and the input/output resources of all clusters on the different sockets socket0 and socket1 can be scheduled together, and the memories owned by the different sockets socket0 and socket1 can be shared in the system.

In an exemplary embodiment, through the socket-to-socket interconnect interface ZPI, the packets (also known as flits in the present invention) cached into the different sockets are in a uniform format. In this manner, the memory resource in a system formed by the connected sockets is available for any CPU core or I/O device in the system.

Figure 2A:
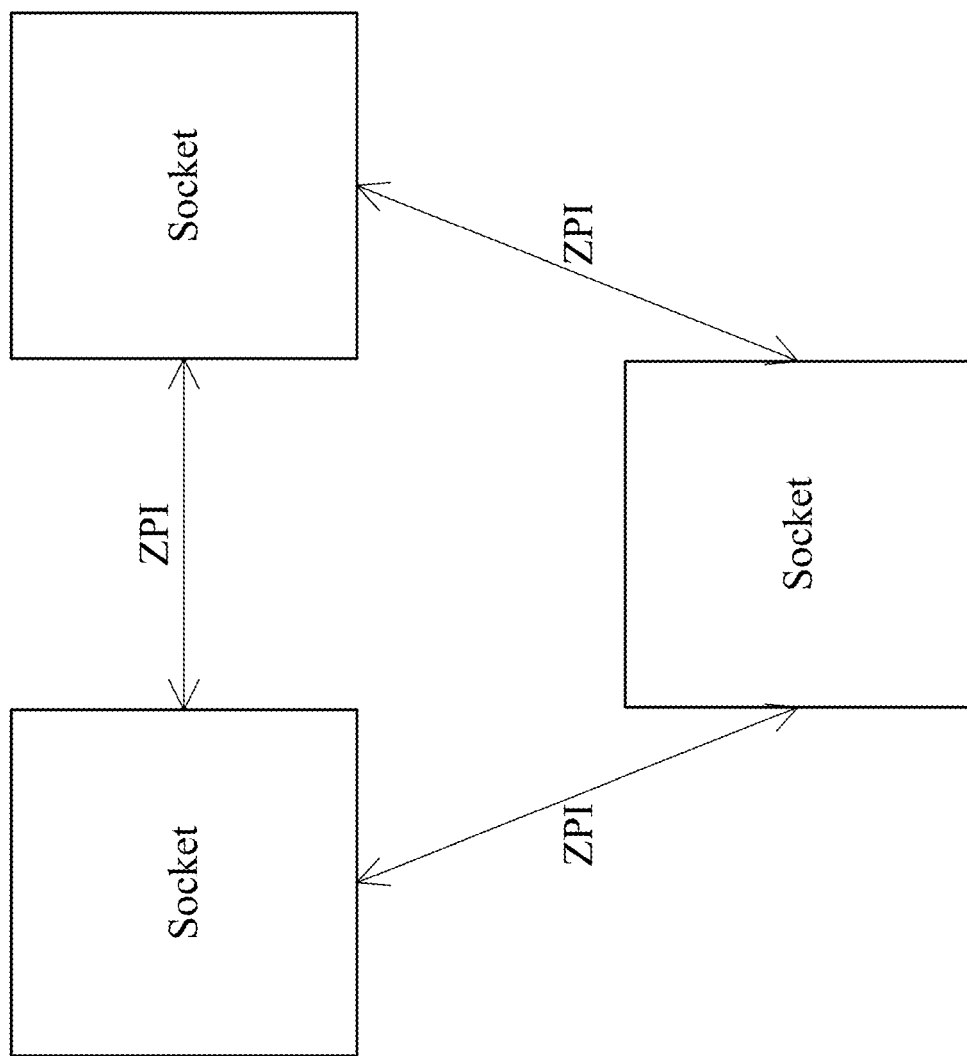
FIGS. 2A to 2C illustrate other planar interconnection embodiments between sockets connected by the socket-to-socket interconnect interface ZPI.
Figure 2B:
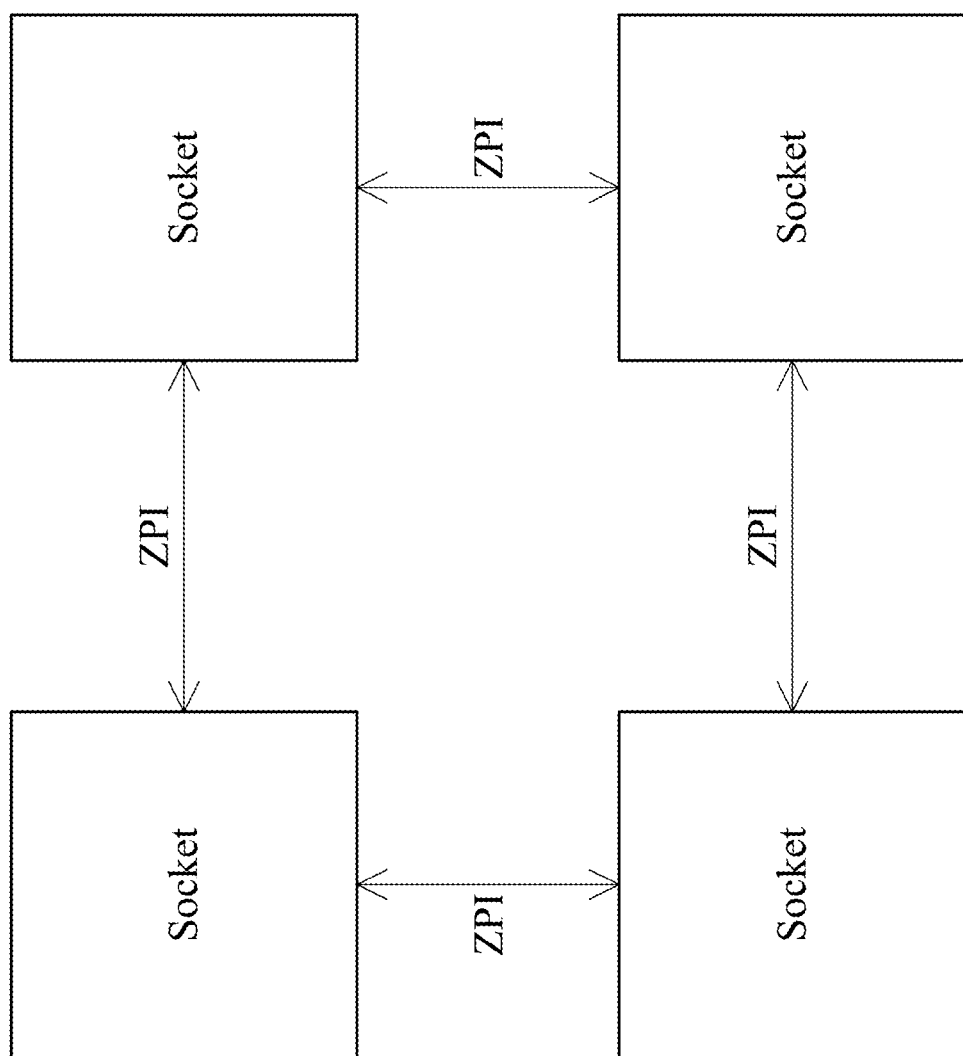
Figure 2C:
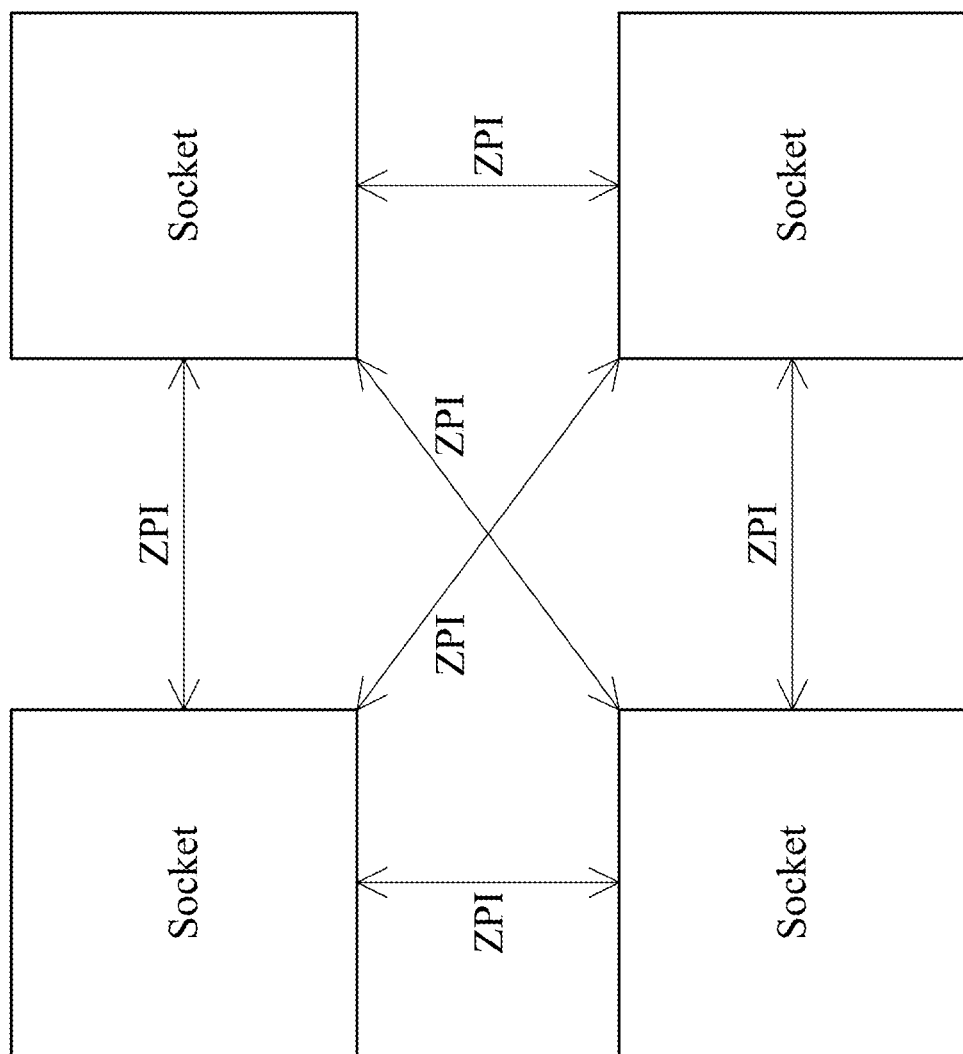

FIGS. 2A to 2C illustrate other planar interconnection embodiments between sockets connected by the socket-to-socket interconnect interface ZPI. FIGS. 2A and 2B use the interconnect interface ZPI to connect the sockets in a ring. FIG. 2A shows a ring of three sockets. FIG. 2B shows a ring of four sockets. FIG. 2C also shows four sockets. Compared with FIG. 2B, more connections using the socket-to-socket interconnect interface ZPI are shown in FIG. 2C, to ensure the shortest communication path between the different sockets. More sockets can be used to implement such planar interconnection structures.

Figure 3A:
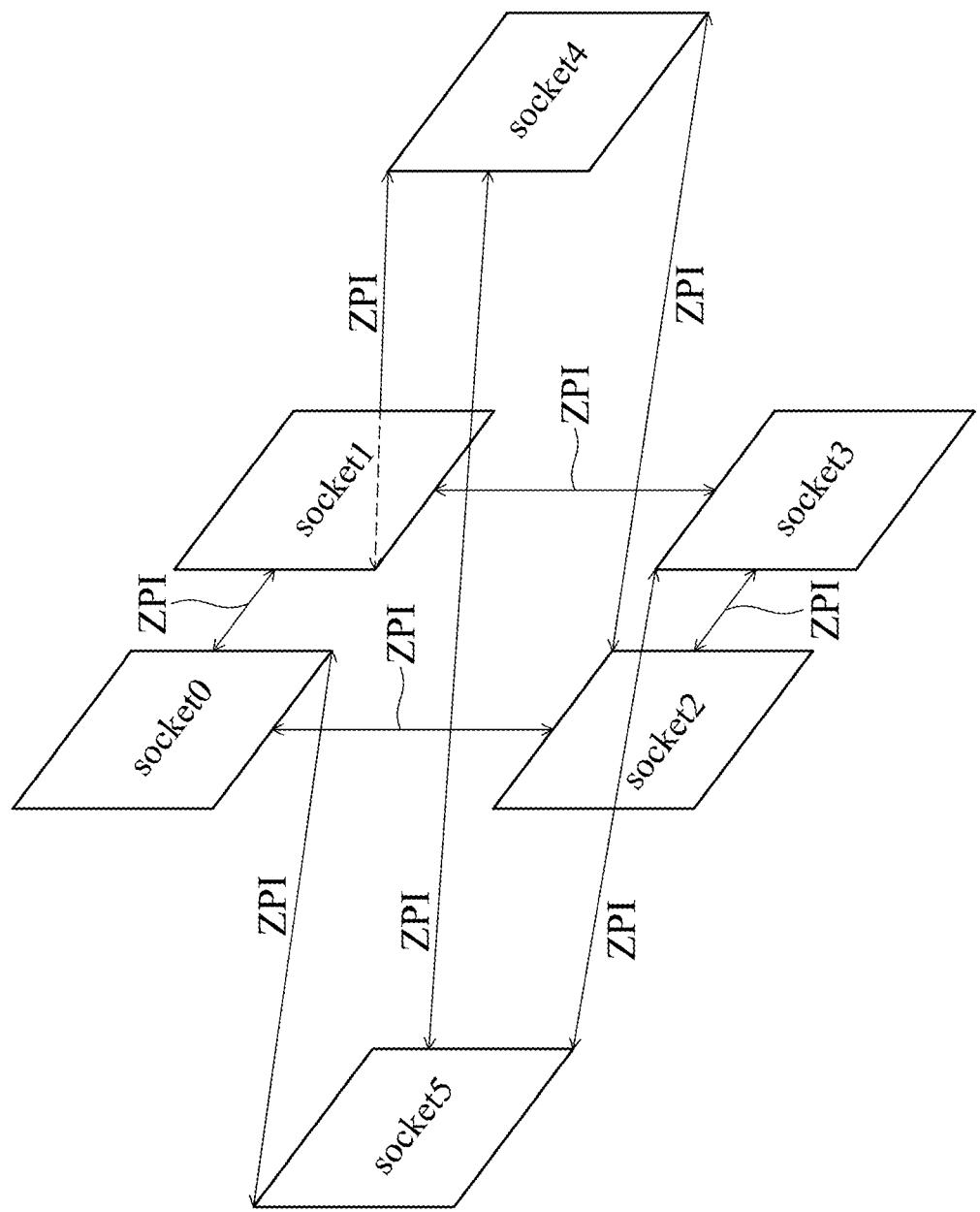
FIGS. 3A and 3B illustrate a three-dimensional (3D) interconnection embodiment between sockets connected by the socket-to-socket interconnect interface ZPI.
Figure 3B:
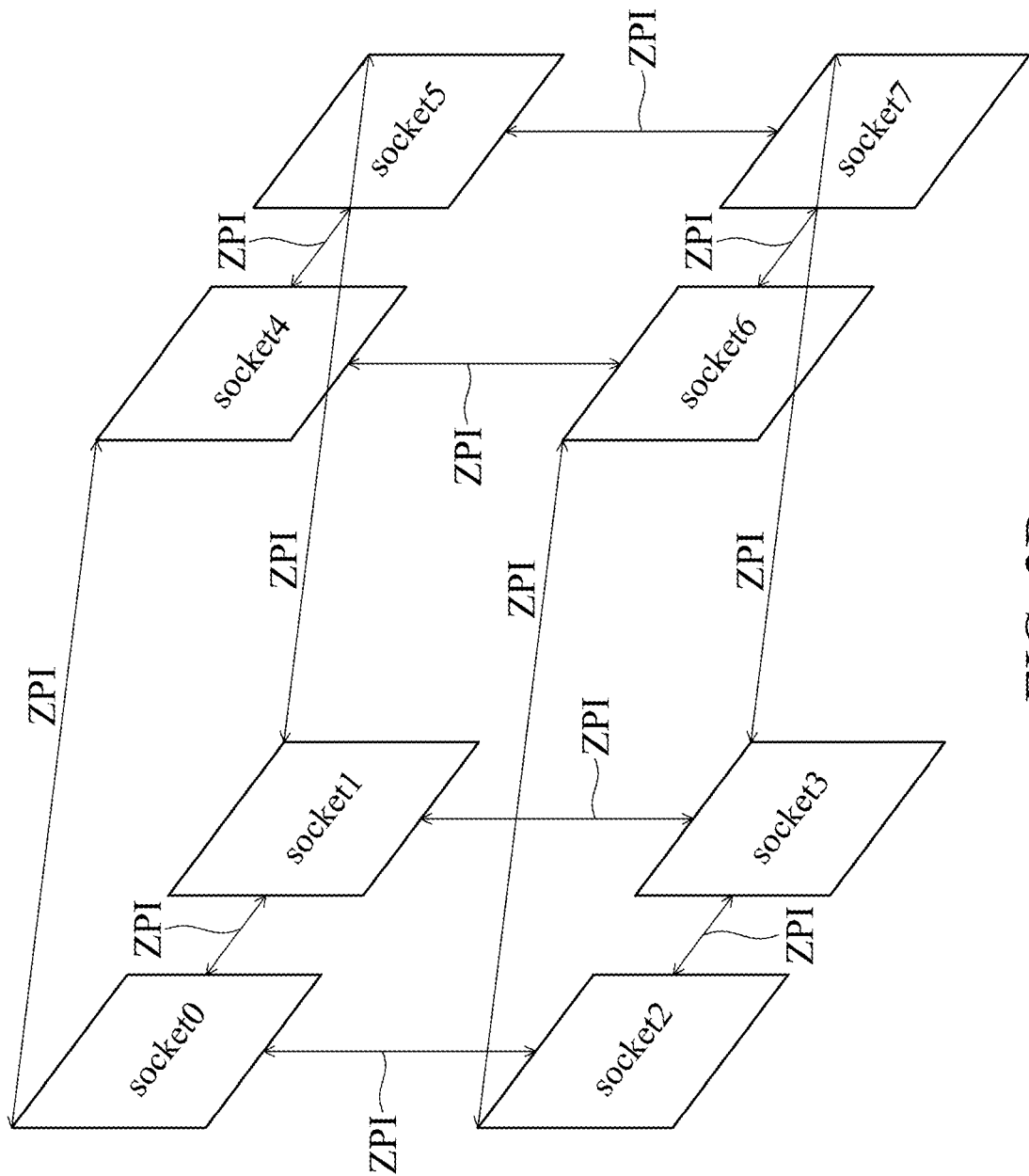

FIGS. 3A and 3B illustrate three-dimensional (3D) interconnection embodiments between sockets connected by the socket-to-socket interconnect interface ZPI. FIG. 3A illustrates a three-layer interconnection structure. The four sockets socket0-socket3 form a plane (belonging to the same layer). There is one socket socket4 in the front layer. There is one socket socket5 in the back layer. In addition to the connections (through the socket-to-socket interconnect interface ZPI) that connect the middle layer with the front-layer socket socket4 and connect the middle layer with the back-layer socket socket5, the front-layer socket socket4 is further connected to the back-layer socket socket5 through the socket-to-socket interconnect interface ZPI. The different layers are connected in a ring. FIG. 3B shows a two-layer interconnection structure. The sockets socket0-socket3 in the first layer are connected to the sockets socket4-socket7 in the second layer one-to-one by the socket-to-socket interconnect interface ZPI. A three-dimensional interconnection structure can involve more layers. There may be more sockets in each layer.

In addition, the die-to-die interconnect interface that connects dies is introduced in the following paragraphs, which is named a ZDI interconnect interface.

Figure 4:
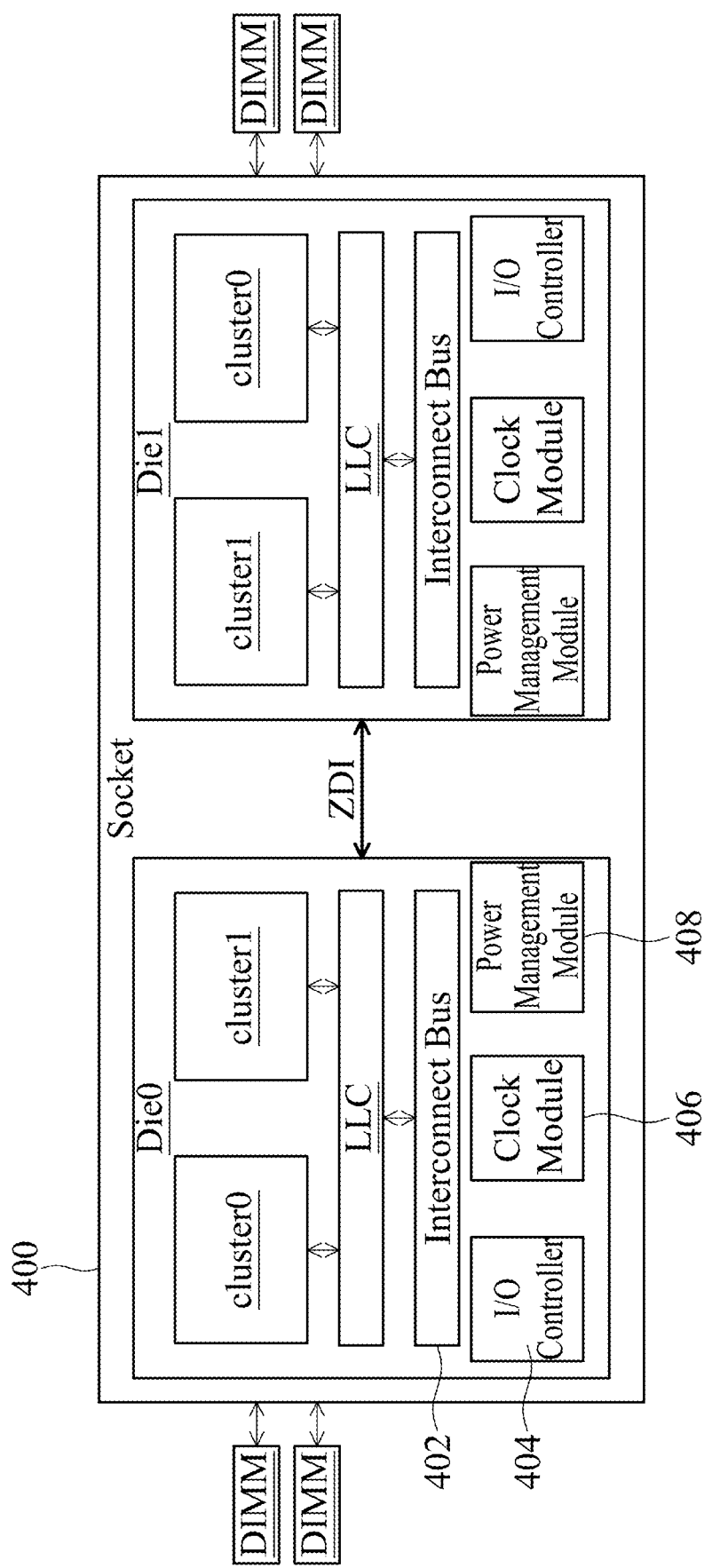
FIG. 4 illustrates the die-to-die interconnect interface ZDI in accordance with an exemplary embodiment of the present invention.

FIG. 4 illustrates the die-to-die interconnect interface ZDI in accordance with an exemplary embodiment of the present invention. The two dies Die0 and Die1 in the same socket 400 are connected through the die-to-die interconnect interface ZDI (also labeled ZDI). Other embodiments may have more dies packed in the same socket. Each die may provide a plurality of clusters. As shown, there is a last level cache LLC, an interconnect bus 402, and various components (such as an input/output controller 404, a clock module 406, a power management module 408, etc.) in each die. It is not intended to limit the architecture of a die.

The socket-to-socket interconnect interface ZPI and the die-to-die interconnect interface ZDI can be used in combination for the communication between the dies in the different sockets.

Figure 5A:
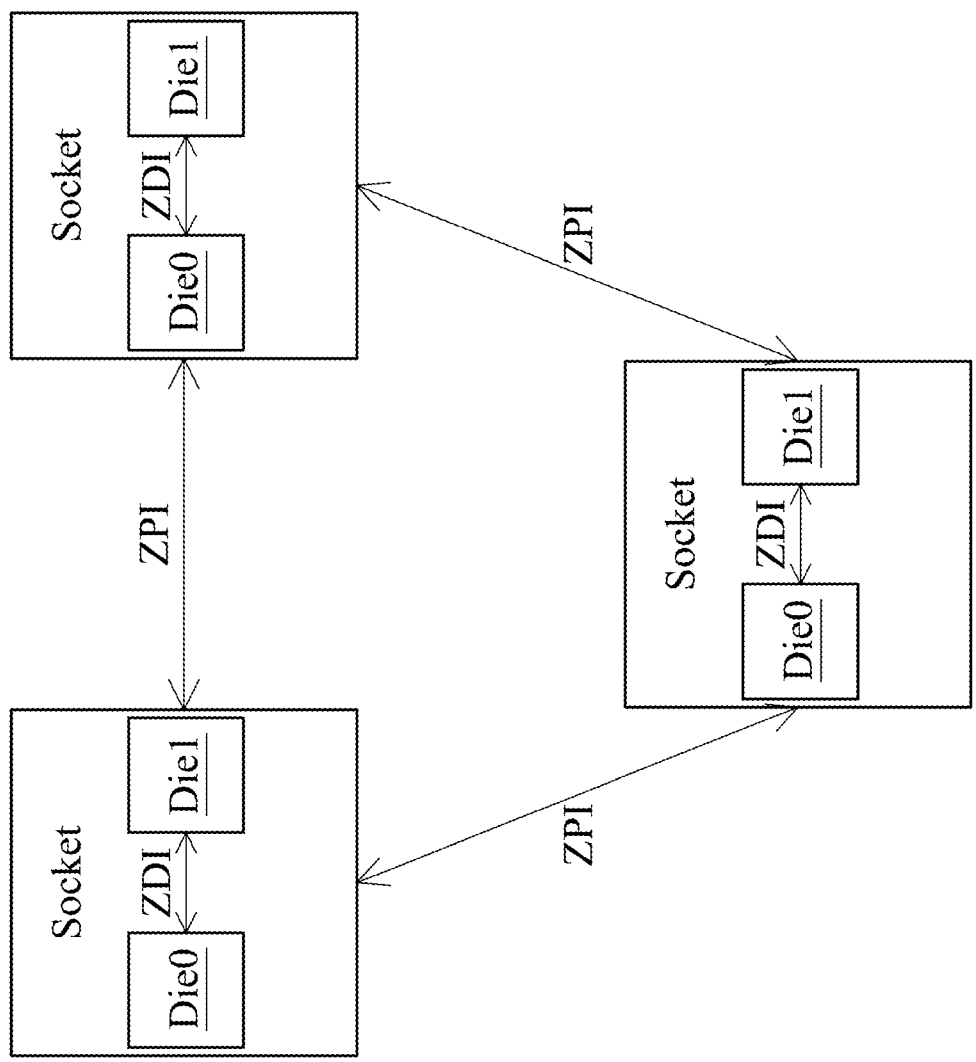
FIGS. 5A to 5C illustrate planar interconnection embodiments.
Figure 5B:
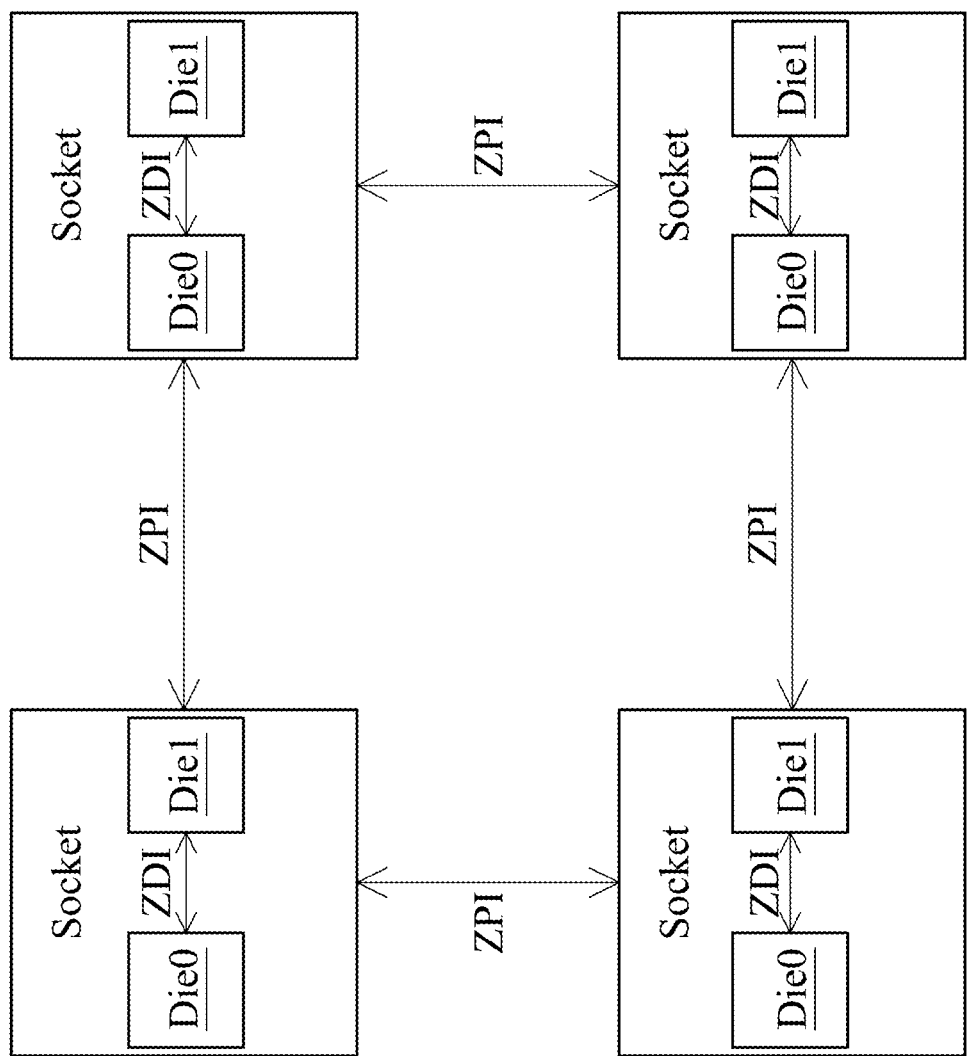
Figure 5C:
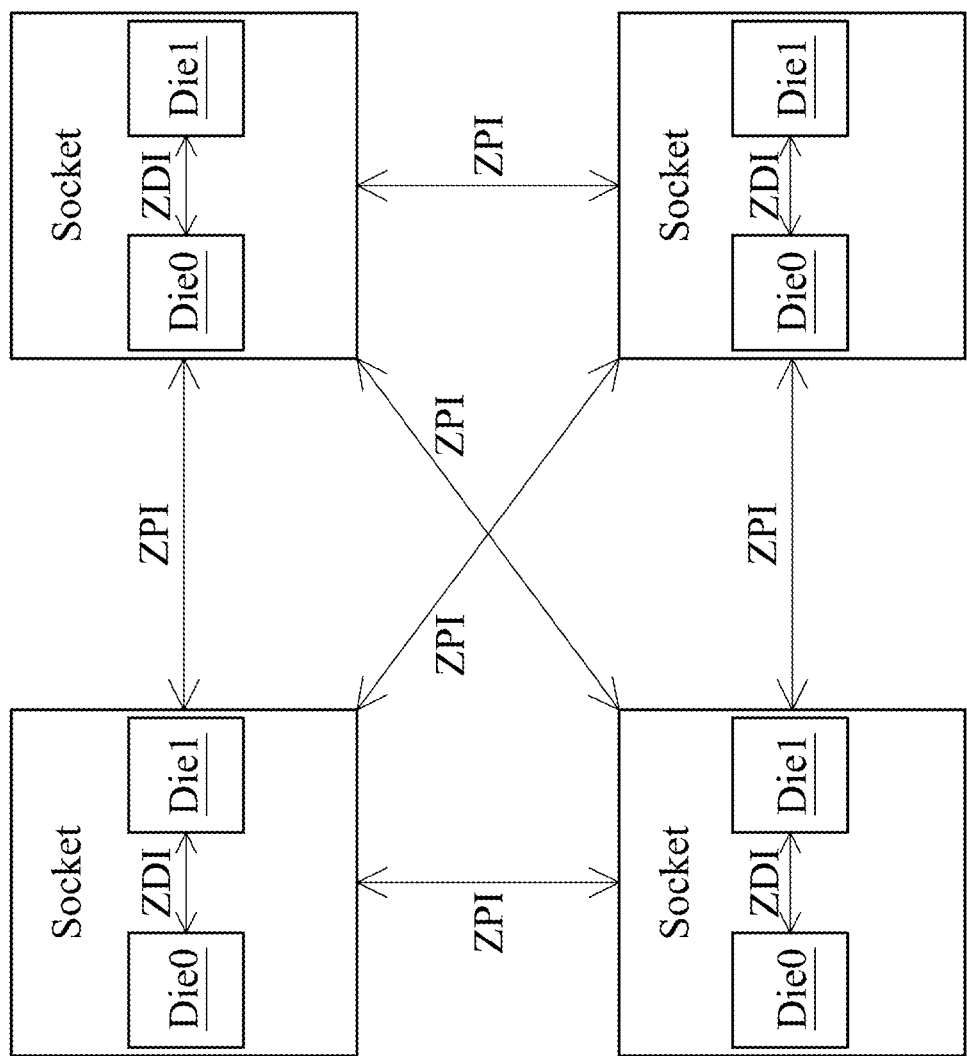

FIGS. 5A to 5C illustrate planar interconnection embodiments. The sockets are connected through the socket-to-socket interconnect interface ZPI, and the dies in the same socket are connected through the die-to-die interconnect interface ZDI. FIG. 5A illustrates a ring of three sockets connected through the socket-to-socket interconnect interface ZPI, and the dies in the same socket are connected through the die-to-die interconnect interface ZDI. In this manner, six dies form a system with shared resources. FIG. 5B illustrates a ring of four sockets connected through the socket-to-socket interconnect interface ZPI, and the dies in the same socket are connected through the die-to-die interconnect interface ZDI. In this manner, eight dies form a system with shared resources. Compared with FIG. 5B, more connections using the socket-to-socket interconnect interface ZPI are shown in FIG. 5C, to ensure the shortest communication path between the dies in the different sockets. In other exemplary embodiment, each socket may include the other number of dies.

Figure 6A:
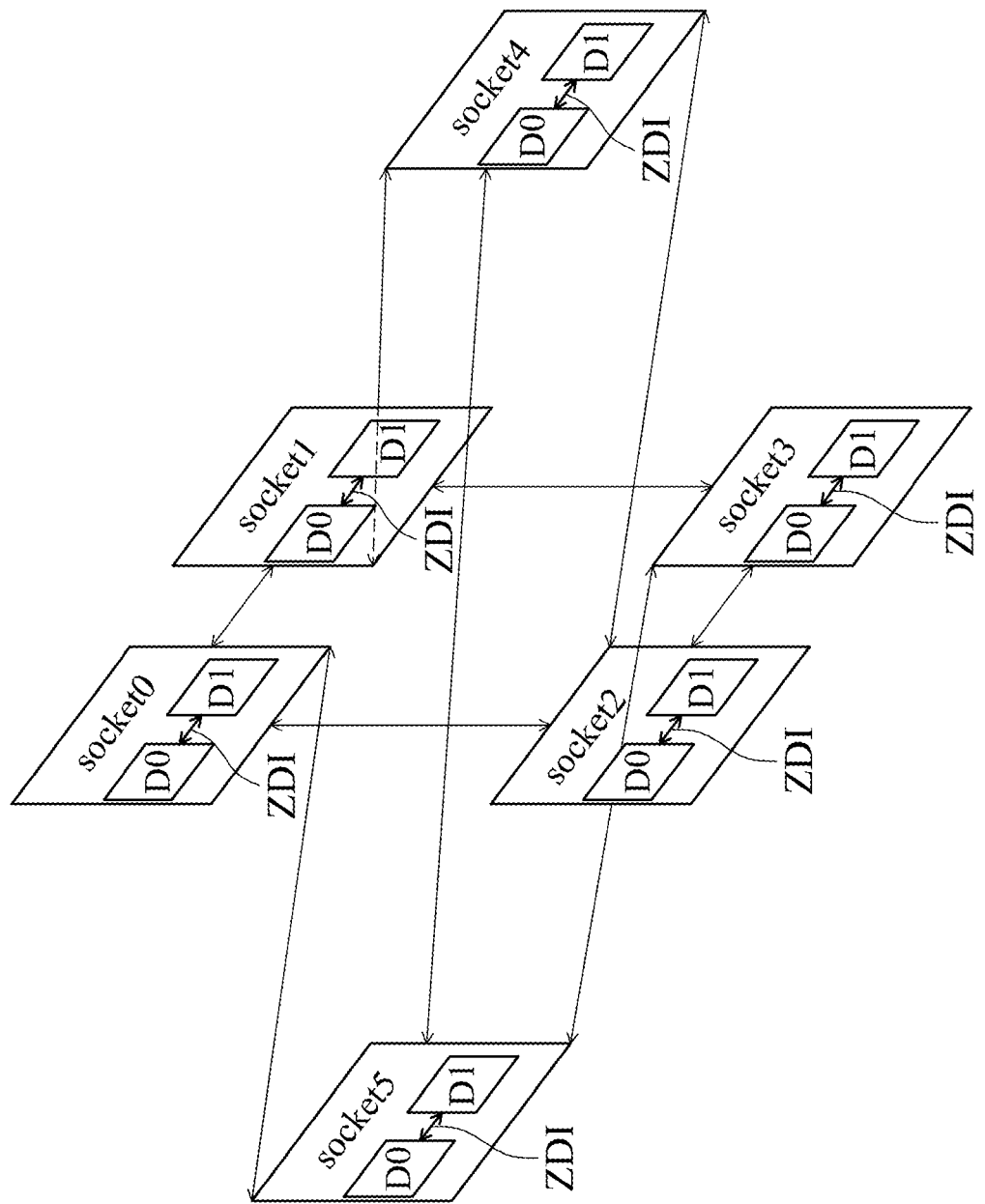
FIGS. 6A and 6B illustrate a three-dimensional interconnection embodiment.
Figure 6B:
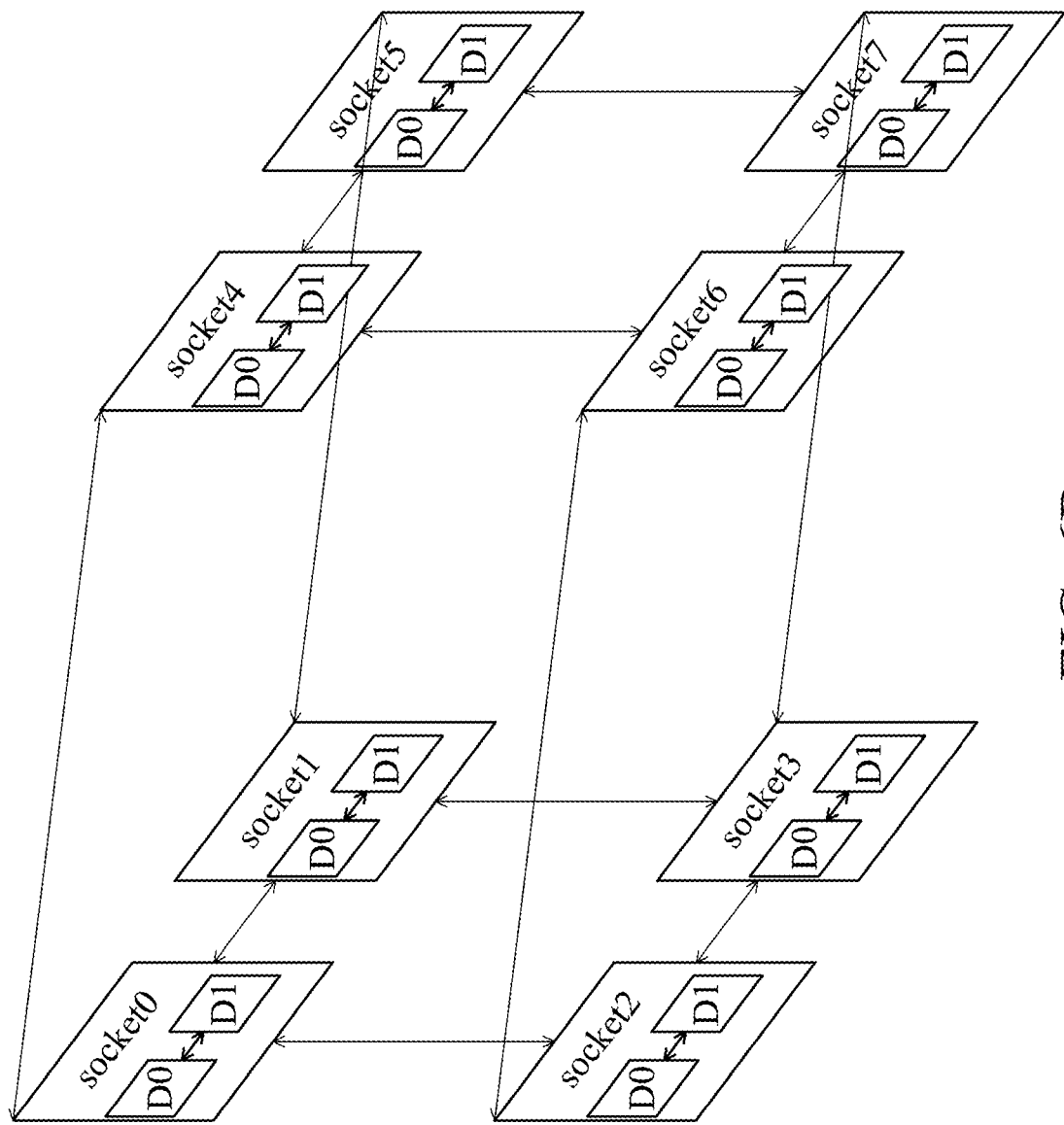

FIGS. 6A and 6B illustrate three-dimensional interconnection embodiments. The sockets are connected through the socket-to-socket interconnect interface ZPI, and the dies in the same socket are connected through the die-to-die interconnect interface ZDI. FIG. 6A illustrates a three-layer architecture. Each layer may include just one single socket or a plane of sockets. Each socket may include a plurality of dies (such as D0, D1). The three layers may be connected in a ring through the socket-to-socket interconnect interface ZPI and the die-to-die interconnect interface ZDI. Each die is regarded as a node in the system and can control the resources of the other nodes. FIG. 6B illustrates the double-layer architecture. In the two planes, each socket includes a plurality of dies. Each die in the double-layer architecture is regarded as a node in the system and can control the resources of the other nodes. The three-dimensional interconnection structure can be expanded to more layers, and there may be the other number of dies in each socket.

In a chipset application, the interconnect interfaces ZPI and ZDI of the present invention can be used as follows.

Figure 7:
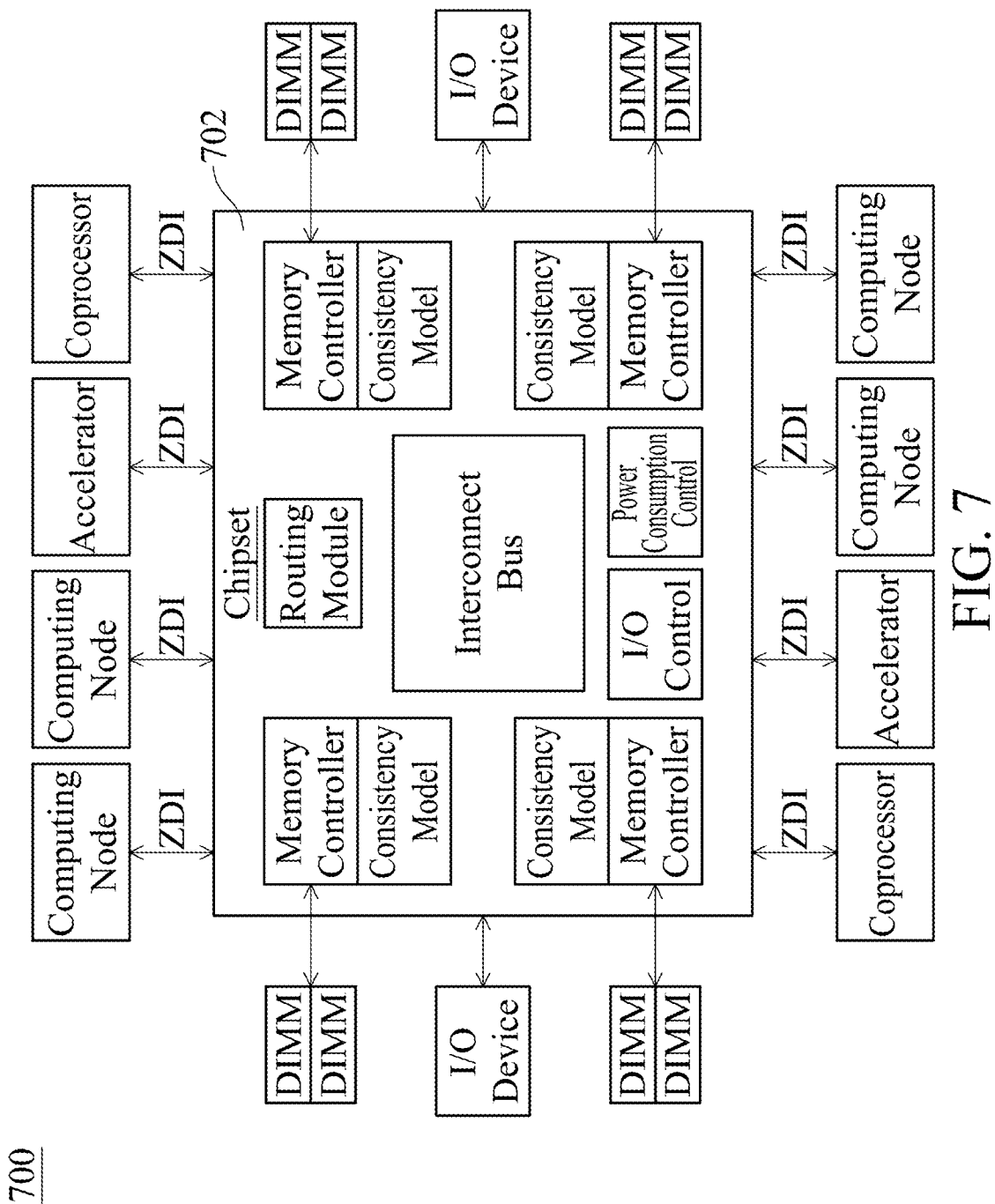
FIG. 7 illustrates a socket 700 that includes a chipset 702 (a die) and other chips (e.g., a plurality of dies of computing nodes, coprocessors, and accelerators)

FIG. 7 illustrates a socket 700 that includes a chipset 702 (a die) and other chips (e.g., a plurality of dies of computing nodes, coprocessors, and accelerators). The chipset 702 is connected to other chips (the computing nodes, coprocessors, and accelerators) through the die-to-die interconnect interface ZDI. In order to form a larger system, multiple chipset sockets can be connected through the socket-to-socket interconnect interface ZPI to form the planar interconnection structure shown in FIGS. 2A-2C or the three-dimensional interconnection structure shown in FIGS. 3A and 3B. In another exemplary embodiment, multiple chipsets may be packed in the same socket. Such sockets may be connected through the socket-to-socket interconnect interface ZPI as those planar interconnection structure shown in FIGS. 5A to 5C or the 3D interconnection structure shown in FIGS. 6A, 6B, and thereby a huge system is established.

The foregoing shows a variety of architectures of a multi-chip processing system.

The packet routing from one node to another node within the multi-chip processing system is discussed below.

Figure 8:
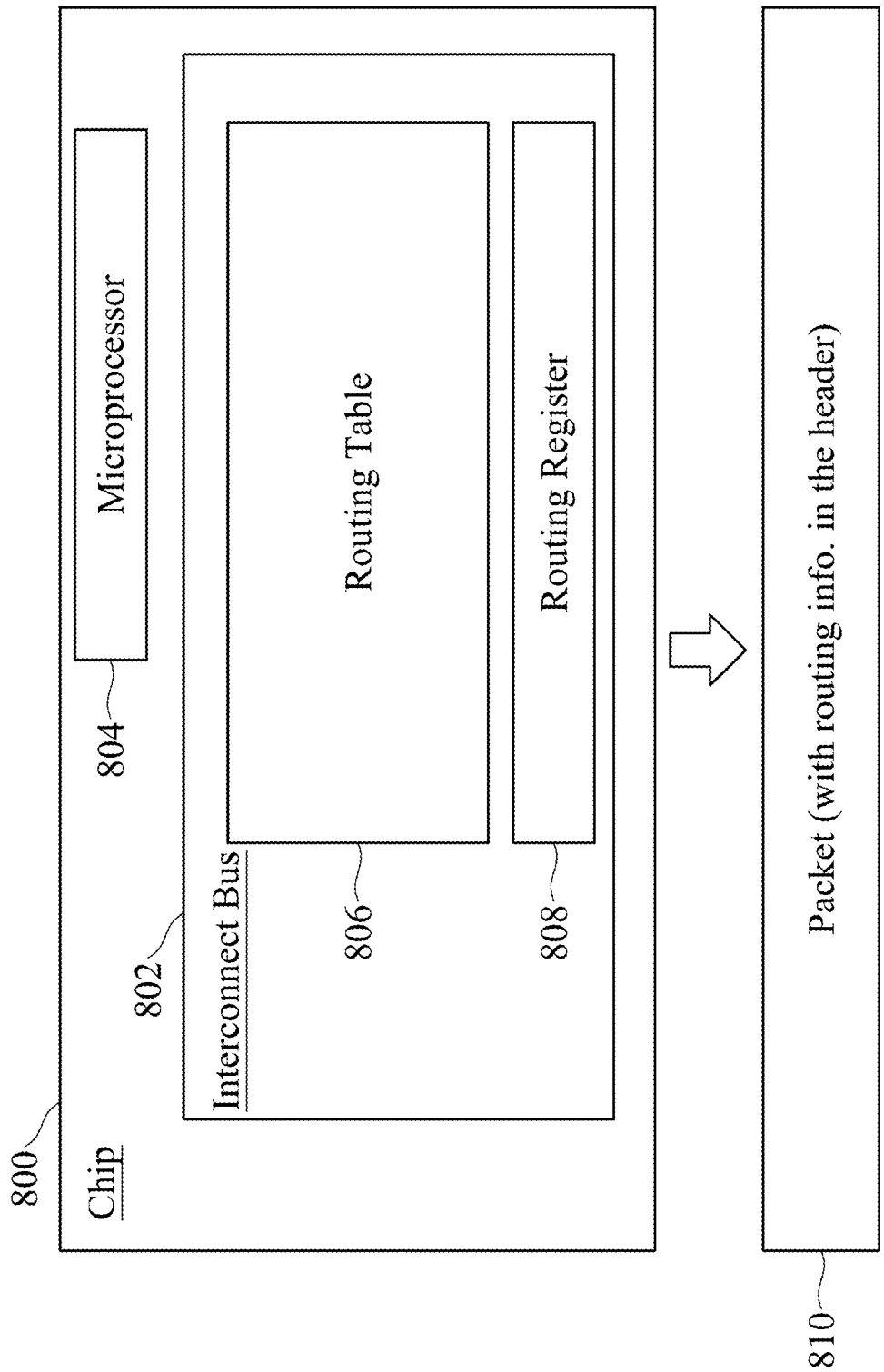
FIG. 8 illustrates a design for packet routing in accordance with an exemplary embodiment of the present invention.

FIG. 8 illustrates a design for packet routing in accordance with an exemplary embodiment of the present invention. A chip 800 includes an interconnect bus 802 and a microprocessor 804 coupled to the interconnect bus 802. The interconnect bus 802 stores a routing table 806. The routing table 806 lists the routing paths from the chip 800 to the other nodes. When the chip 800 is operated as the source node, a routing path from the source node to the destination node is obtained by checking the routing table 806, and routing information is generated to indicate the routing path. The generated routing information is written into a routing register 808 as routing information to be loaded into a header of a packet. As shown, the packet 810 output from the chip 800 and transferred to the next node contains the routing information. The routing information carried in the packet 810 is also transferred all the way between the nodes, as a guide for transferring the packet 810 within the multi-chip processing system.

Figure 9:
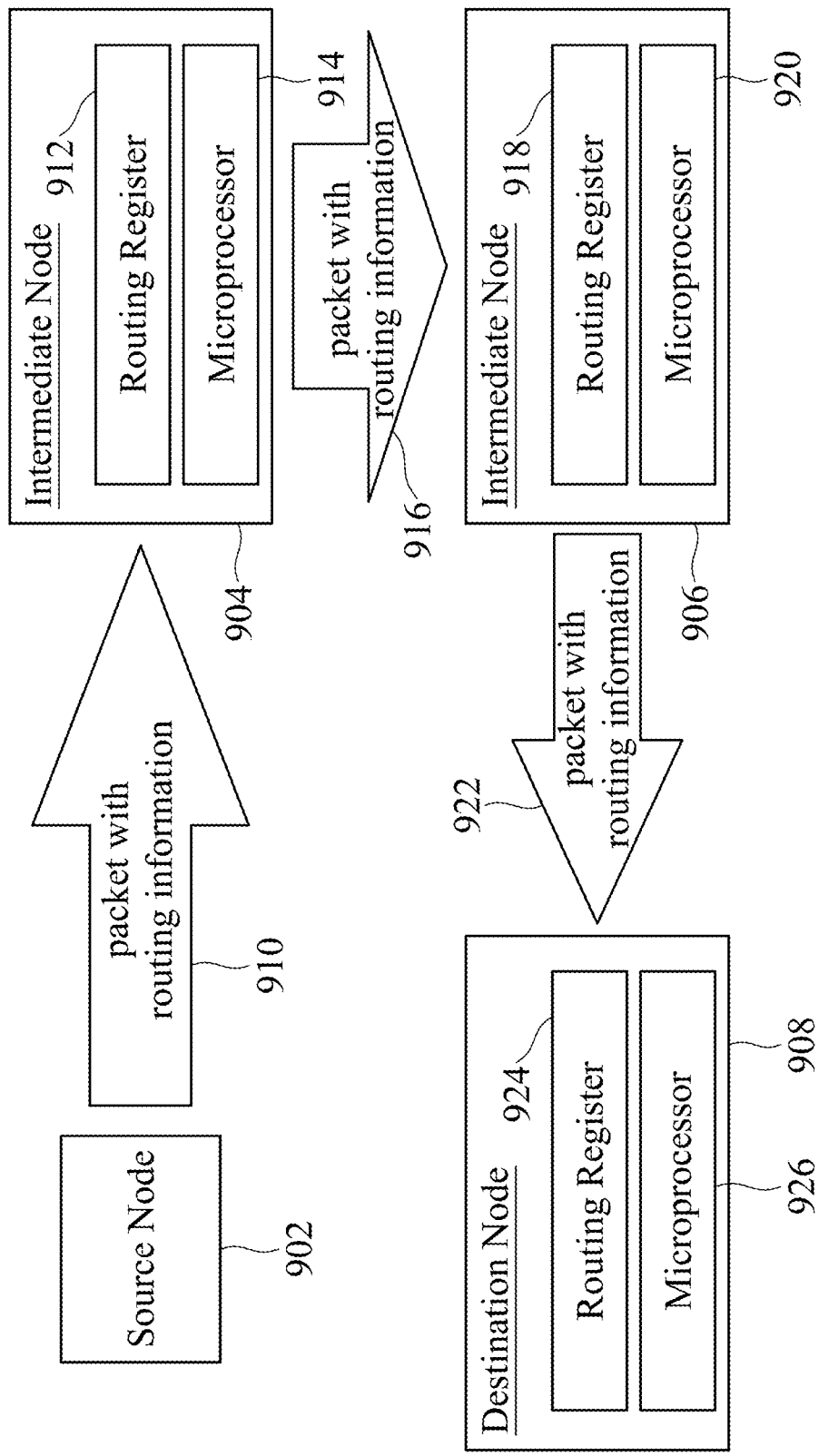
FIG. 9 illustrates the transfer of the routing information between the nodes in accordance with an exemplary embodiment of the present invention.

FIG. 9 illustrates the transfer of the routing information between the nodes in accordance with an exemplary embodiment of the present invention.

In FIG. 9, there are a source node 902, two intermediate nodes 904 and 906, and a destination node 908. The source node 902 outputs a packet 910 to the intermediate node 904. The routing information contained in packet 910 is written into a routing register 912 (provided by an interconnect bus of a chip that is the intermediate node 904). A microprocessor 914 of the intermediate node 904 modifies the routing information in the routing register 912 to note that the packet transfer has progressed to the intermediate node 904, and then outputs the packet 916 containing the modified routing information to the intermediate node 906. The routing information contained in packet 916 is written into the routing register 918 (provided by an interconnect bus of a chip that is the intermediate node 906). A microprocessor 920 of the intermediate node 906 modifies the routing information in the routing register 918 to note that the packet transfer has progressed to the intermediate node 906, and then outputs the packet 922 containing the modified routing information to the destination node 908. The routing information contained in the packet 922 is written into the routing register 924 (provided by an interconnect bus of a chip that is the destination node 908).

The modifications made on the routing information all the way during the transfer of the packet include noting the transfer progress. In addition, if a request is carried in the transferred packet, its completion element has to be returned to the source node. A solution is to return the completion element along the same route that the request comes. The microprocessor 926 of the destination node 908 can query the routing register 924 for the routing path that the request comes and, accordingly, the completion element can be returned to the source node 902 on the same route. The concept of routing information modification shown in FIG. 9 can be extended to the other number of intermediate nodes.

In particular, the routing table 806 may be burned in the interconnect bus 802 during manufacturing according to the preset architecture of the multi-chip processing system. Or, in a more flexible case, the routing table may be dynamically configured according to the real architecture of the multi-chip processing system.

In an exemplary embodiment, a multi-chip processing system (or even a processing system including multiple sockets) is established by the manufacturer. The manufacturer can determine the routing paths between the nodes. A fixed routing table 806 is burned into the interconnect bus 802.

A fixed routing path from a source node to a destination node can be formed according to the following rules: first, crossing the planes; taking the shortest path in the plane containing the destination node; and, selecting between the several shortest paths to take the next node in the clockwise direction. Taking the three-dimensional interconnection structure in FIG. 3B as an example, if the source node is socket0 and the destination node is socket7, the routing path can be from socket0 to socket4 to socket5 to socket7. The path from socket0 to socket4 is based on the concept of crossing the planes first. The path from socket4 to socket5 is based on the concept of taking the next node clockwise. The path from socket5 to socket7 is based on the concept of taking the shortest path. The configuration rule of routing path can have other implementations. For example, when several paths are the shortest on the plane of the destination node, the next taken node may be in the counterclockwise direction.

In an exemplary embodiment, the multi-chip processing system runs software to scan the interconnection structure of all nodes to generate routing paths between the different nodes, and then stores the routing paths in the routing table 806 within the interconnect bus 802. For example, when the multi-chip processing system is powered on, the basic input and output system (BIOS) scans the nodes, and then establishes the routing paths between the different nodes according to the interconnection structure of the different nodes. The routing paths are dynamically arranged. The software may also follow the aforementioned routing path configuration rules. For example, to form a routing path from a source node to a destination node, the running software follow these rules: first, crossing the planes; taking the shortest path in the plane containing the destination node; and, selecting between the several shortest paths to take the next node in the clockwise (or counterclockwise) direction.

Figure 10:
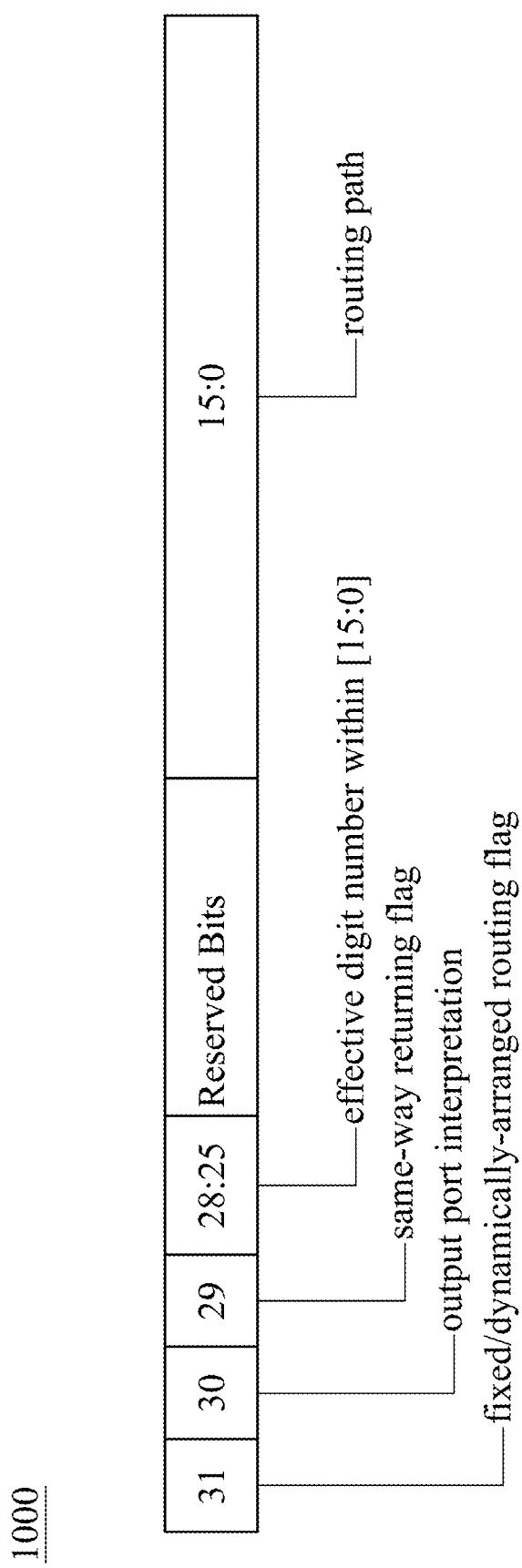
FIG. 10 illustrates a format 1000 for recording the routing information in accordance with an exemplary embodiment of the present invention, which includes 32 bits.

FIG. 10 illustrates a format 1000 for recording the routing information in accordance with an exemplary embodiment of the present invention, which includes 32 bits. Bit[31] indicates that the routing path indicated in the routing information is fixed or dynamically arranged. Bit[30] indicates that an output port of an intermediate node is selected clockwise or counterclockwise relative to an input port of the intermediate node. Bit[29] indicates whether to return a completion element on the same route that its request comes. Bit[15:0] records the routing path. Bit[28:25] indicates the effective digits of Bit[15:0], which shows the progress of the routing. During the packet transfer, Bit[28:25] is gradually modified by each node to change the number of effective bits in Bit[15:0], which also notes the progress of the transfer.

In an exemplary embodiment, Bit[15:0] in the format 1000 records the routing path in the following manner. For an intermediate node, the corresponding bits in Bit[15:0] form a count value, which is used to count clockwise or counterclockwise relative to an input port of the intermediate node and thereby an output port of the intermediate node is obtained. For the source node, the corresponding bits in Bit[15:0] form a port number, and the port with the port number is selected as an output port of the source node. For the destination node, the corresponding bits in Bit[15:0] form a port number, and the port with the port number is selected as an output port of the destination node.

In another exemplary embodiment, in all nodes, the corresponding bits in Bit[15:0] of the format 1000 are interpreted as a port number. In this way, Bit[30] can be a reserved bit, without indicating how to select the output port (clockwise and counterclockwise). Note that the definition and the modification way of each bit of the routing information are various.

FIG. 11 takes the routing path from socket0 to socket4 to socket5 to socket7 in the three-dimensional interconnection structure of FIG. 3B as an example, to show the modifications made on the routing information along the routing path.

The socket socket0 is the source node, and the socket socket7 is the destination node. The source node socket0 queries the routing table (e.g., 806) to find a routing path from socket0 to socket7 and, accordingly, generates and writes routing information 1102 that indicates the routing path into the routing register (e.g., 808) in the source node socket0 In the routing information 1102, Bit[31] is "1", showing that the routing path indicated in the routing information 1102 is dynamically arranged by software and is not fixedly provided by the manufacturer, Bit[28:25] is "0111" (=7), showing that for the source node socket 0 only Bits [7:0] are effective bits within the Bits [15:0]. For the source node socket0 the corresponding bits of the recorded routing path are interpreted as the port number of the socket socket0 In the routing information 1102, the two bits in Bits [7:0] related to the source node socket0 show "00" (=0), it means that the source node socket0 uses the number 0 port (connected to the intermediate node socket4) to output a packet. In particular, the routing information 1102 is modified by the source node socket0 to generate modified routing information 1104 that is packed into the output packet to be transferred to the intermediate node socket4. Compared with the routing information 1102, in the routing information 1104, Bit[29] of has been modified to "1" to indicate that a completion element has to be returned on the same route, and Bit[28:25] has been modified to "0101" (=5) to show that for the intermediate node socket4 only Bits [5:0] are effective bits within the Bits [15:0].

For the intermediate node socket4, Bit[5:4] of the routing information 1104 is interpreted as a count value. Referring to Bit[30] of the routing information 1104, "0" means that starting from the input port at which the intermediate node socket4 receives the input packet, a clockwise count is performed to select an output port for the intermediate node socket4. In the routing information 1104, Bits[5:4] is "00", it means that by counting clockwise from the input port, the number 0 port (connected to the next intermediate node socket5) is selected as the output port. In particular, the routing information 1104 is modified by the intermediate node socket4 to generate routing information 1106 that is packed into the output packet to be transferred to the next intermediate node socket5. Compared with the routing information 1104, in the routing information 1106, Bit[28:25] has been modified to "0011". It means that for the socket socket5, effective routing path data is contained in only Bit[3:0] of the received routing information 1106.

For the intermediate node socket5, Bit[3:2] of the routing information 1106 is interpreted as a count value. Referring to Bit[30] of the routing information 1106, "0" means that starting from the input port at which the intermediate node socket5 receives the input packet, a clockwise count is performed to select an output port. In the routing information 1106, Bits[3:2] is "01", it means that by counting clockwise from the input port, the number 1 port (connected to the destination node socket7) is selected as the output port. In particular, the routing information 1106 is modified by the intermediate node socket5 to generate routing information 1108 that is packed into the output packet to be transferred to the destination node socket7. Compared with the routing information 1106, in the routing information 1108, Bit[28:25] has been modified to "0001". It means that for the destination node socket7, effective routing path data is contained in only Bit[1:0] of the received routing information 1108.

For the destination node socket7, Bit[1:0] of the routing information 1108 is interpreted as a port number indicating the input port through which the destination node socket7 receives the packet from the intermediate node socket5. In the routing information 1108, Bits [1:0] is "01", it means that the destination node socket7 uses the number 1 port (connected to the intermediate node socket5) to receive the packet. The destination node socket7 does not change the routing information 1108 and stores the identical routing information 1110 in its routing register. A completion element is returned back to the source node socket0 according to the routing information 1110 read from the routing register of the destination node socket7. Accordingly, the completion element is returned along the same route that the source node socket0 transferred the request to the destination node socket7.

When being returned according to the routing information 1110, the completion element is output from the number 1 port (as indicated by Bit[1:0] of the routing information 1110) of the socket socket7 to be transmitted to the socket socket5. In particular, the routing information 1110 is modified by the socket socket7 to generate routing information 1112 that is packed with the completion element to form a packet to be transferred to the socket socket5. In the routing information 1112, Bit[30] is "1", which is means that at each node of the intermediate nodes along the return path, an output port is selected by counting counterclockwise with respect to the input port. Bit[28:25] has been modified to "0011" in the routing information 1112, which means that for the socket socket5, effective routing path data is contained in only Bit[3:0] of the received routing information 1112.

The socket socket5 interprets Bit[3:2] of the routing information 1112 as a count value. Because Bit[30] of the routing information 1112 is "1", a counterclockwise counting, starting from the input port at which the socket socket5 receives the packet from the socket socket7, is performed to select an output port for the socket socket5 to output the packet. In the routing information 1112, Bits[3:2] is "01", it means that by counting counterclockwise from the input port, the number 1 port (connected to the socket socket4) is selected as the output port. In particular, the routing information 1112 is modified by the socket socket5 to generate routing information 1114 that is packed into the packet to be transferred to the socket socket4. Compared with the routing information 1112, Bit[28:25] has been modified to "0101" in the routing information 1114. It means that for the socket socket4, effective routing path data is contained in only Bit[5:0] of the received routing information 1114.

The socket socket4 interprets Bit[5:4] of the routing information 1114 as a count value. Because Bit[30] of the routing information 1114 is "1", a counterclockwise count, starting from the input port at which the socket socket4 receives the packet from the socket socket5, is performed to select an output port for the socket socket4 to output the packet. In the routing information 1114, Bits[5:4] is "00", it means that by counting counterclockwise from the input port, the number 0 port (connected to the socket socket0 is selected as the output port. In particular, the routing information 1114 is modified by the socket socket4 to generate routing information 1116 that is packed into a packet to be transferred to the socket socket0 Compared with the routing information 1114, Bit[28:25] has been modified to "0111" in the routing information 1116. It means that for the socket socket0 effective routing path data is contained in only Bit[7:0] of the received routing information 1116.

The socket socket0 is the destination node for the completion element. Bit[7:6] of the routing information 1116 is interpreted as a port number indicating the input port through which the socket socket0 receives the packet from the socket socket4. In the routing information 1116, Bits [7:6] is "00", it means that the socket socket0 uses the number 0 port (connected to the socket socket4) to receive the packet carrying the completion element. The completion element is successfully returned from socket7 to socket5 to socket 4 and finally to socket0.

The above exemplary embodiments may have other variations. The definition and setting of the different bits of routing information may have the other designs.

Figure 12:
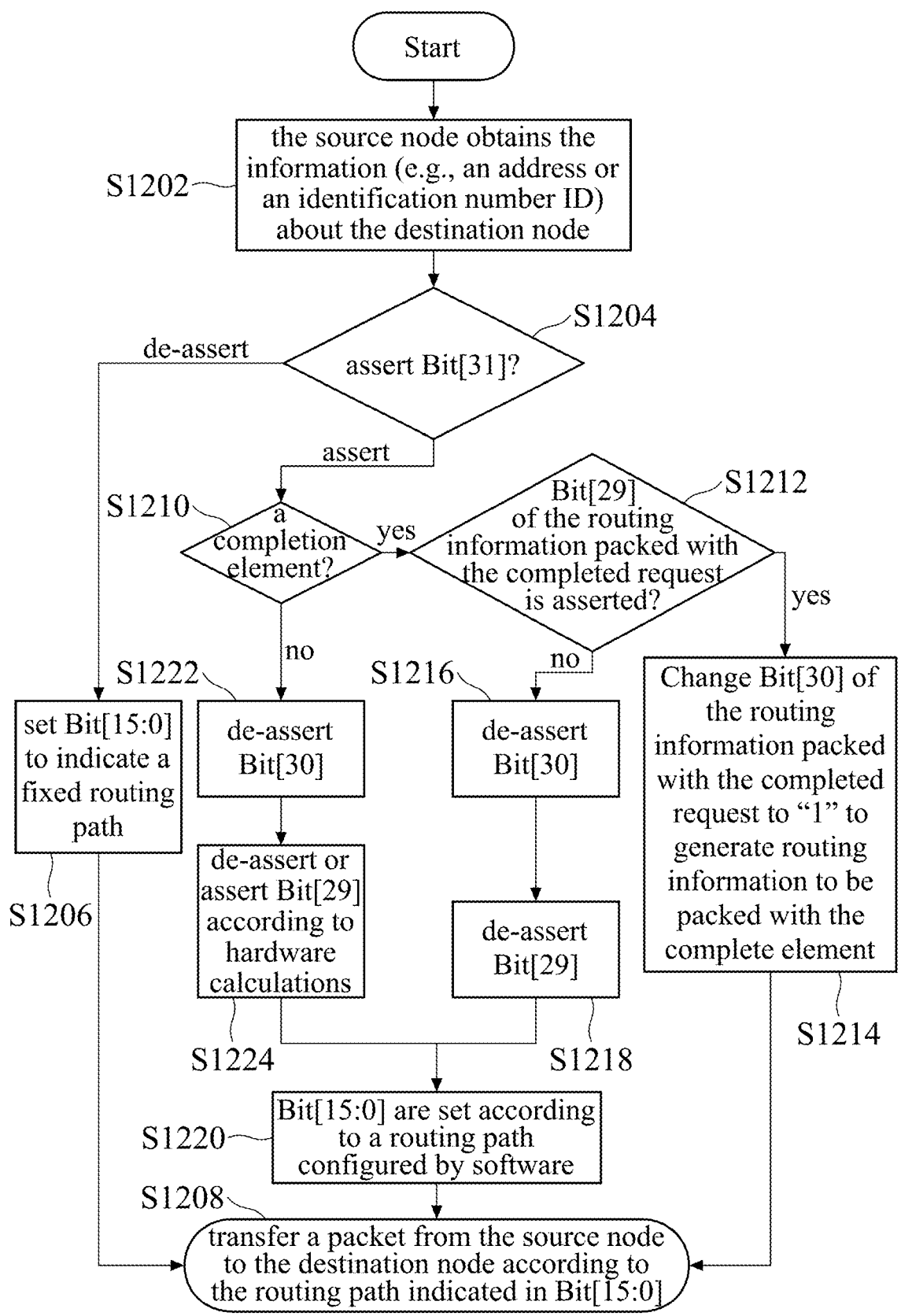
FIG. 12 is a flowchart depicting how to edit and how to use the 32-bits routing information in accordance with an exemplary embodiment of the present invention.

FIG. 12 is a flowchart depicting how to edit and how to use the 32-bits routing information in accordance with an exemplary embodiment of the present invention.

In step S1202, the source node obtains the information (e.g., an address or an identification number ID) about the destination node.

In step S1204, it is determined whether to assert (set to "1") Bit[31] of the routing information. If not, the flow goes to step S1206 to set Bit[15:0] of the routing information to indicate a fixed routing path, from the source node to the destination node, predetermined by the manufacturer. In step S1208, a packet is transferred from the source node to the destination node according to the fixed routing path that is predetermined by the manufacture and indicated in Bit[15:0] of the routing information.

If step S1204 asserts Bit[31] of the routing information, the routing path is dynamically arranged. In step S1210, it is determined whether the source node is going to return a completion element to the destination node. If yes, step S1212 is performed to identify whether Bit[29] of routing information packed with the completed request is asserted ("1"). If yes, it means that the completion element corresponding to the completed request needs to be returned back to the source of the completed request on the same route. In step S1214, the routing information of the completed request is modified, by which Bit[30] is asserted (set to "1" to change the direction, e.g., changed from clockwise to counterclockwise, that the intermediate nodes adopt to select their output port). The modified routing information is used in the return of the complete element. According to the modified routing information, the flow proceeds to step S1208, the completion element is returned to the source node of the completed request on the same route that the request comes.

If it is recognized in step S1212 that Bit[29] of the completed request is not asserted (is "0"), the completion element does not need to be returned the same way. Step S1216 is performed to de-assert Bit[30] (set to 0) to indicate that there is no need to reverse the direction when determining the output port in each intermediate node, and step S1218 is performed to de-assert Bit[29] (set to 0) to disable returning the completion element on the same route. In step S1220, Bit[15:0] are set according to a routing path configured by software. Then, the flow proceeds to step S1208, the completion element is returned to the source node of the completed request according to the software configured routing path.

When it is determined in step S1210 that the source node is not to return a completion element, and a request is to be transferred instead. The routing information is generated by steps S1222, S1224, and S1220. Step S1222 is performed to de-assert Bit[30] (set to 0) because there is no need to reverse the direction of search used in defining an output port of each intermediate node. Step S1224 is performed to de-assert or assert Bit[29] (set to 0 or 1) according to hardware calculations. In step S1220, Bit[15:0] are set according to a routing path configured by software. Then, the flow proceeds to step S1208, the request is transferred from the source node to the destination node according to the software configured routing path.

In an exemplary embodiment, a method for packet routing within a multi-chip processing system is introduced. Any technology that transfers the aforementioned routing information between the nodes and uses the interconnect bus of each node to manage the transferred routing information falls within the technical scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A multi-chip processing system, comprising:
a first chip, comprising a first interconnect bus, and a first microprocessor coupled to the first interconnect bus, wherein:
the first interconnect bus includes a first routing register;
when the first microprocessor operates the first chip as a source node to output a packet to be transferred to a destination node, routing information indicating a routing path from the source node to the destination node is written into the first routing register, and then loaded from the first routing register to a header of the packet; and
while being transferred within the multi-chip processing system from the source node to the destination node, the packet is guided along the routing path indicated in the routing information carried in the header of the packet.

2. The multi-chip processing system as claimed in claim 1, wherein:
the first interconnect bus has a storage space storing a routing table; and
the routing table lists routing paths from the source node to the other nodes in the multi-chip processing system.

3. The multi-chip processing system as claimed in claim 2, wherein:
the routing table is burned into the first interconnect bus during manufacturing based on a preset architecture of the multi-chip processing system.

4. The multi-chip processing system as claimed in claim 2, wherein:
the routing table is established by scanning a real architecture of the multi-chip processing system when the multi-chip processing system is powered on.

5. The multi-chip processing system as claimed in claim 2, wherein:
a first bit of the routing information indicates whether the routing path indicated in the routing information is fixed or dynamically arranged;
if the routing path is fixed, the routing path indicated in the routing information is provided by that burned in the routing table based on a preset architecture of the multi-chip processing system;
if the routing path is dynamically arranged, the routing path indicated in the routing information is provided by that established in the routing table by scanning a real architecture of the multi-chip processing system when the multi-chip processing system is powered on.

6. The multi-chip processing system as claimed in claim 1, wherein:
the routing information further indicates an effective bit number of the routing path indicated in the routing information; and
the effective bit number is modified along with a transfer of the packet within the multi-chip processing system to note transfer progress.

7. The multi-chip processing system as claimed in claim 1, wherein:
when the packet that the first microprocessor operates the source node to output carries a request, the first microprocessor further evaluates whether a completion element corresponding to the request needs to be returned along the same route, and indicates the evaluated result in a second bit of the routing information; and
as indicated in the second bit of the routing information, the destination node determines whether to return the completion element to the source node along the same route.

8. The multi-chip processing system as claimed in claim 7, wherein:
the routing path indicated in the routing information indicates output port information of intermediate nodes;
the output port information indicates that for each intermediate node an output port is determined by clockwise or counterclockwise counting starting from an input port; and
a third bit of the routing information indicates whether to adopt clockwise counting or counterclockwise counting.

9. The multi-chip processing system as claimed in claim 8, wherein:
when identifying that the second bit of the routing information indicates that the completion element is requested to be returned to the source node along the same route, the destination node reverses the third bit of the routing information.

10. The multi-chip processing system as claimed in claim 9, wherein:
the routing path indicated in the routing information further indicates a port number of an output port of the source node; and
the routing path indicated in the routing information further indicates a port number of an input port of the destination node.

11. The multi-chip processing system as claimed in claim 1, further comprising:
a second chip that is the destination node, comprising a second interconnect bus, and a second microprocessor coupled to the second interconnect bus, wherein:
the second interconnect bus includes a second routing register storing the routing information carried in the header of the packet received by the destination node;
when the packet received by the destination node carries a request, the routing information stored in the second routing register indicates whether to return a completion element along the same route; and
when the second microprocessor determines that the routing information stored in the second routing register indicates that the completion element is requested to be returned along the same route, the completion element is transferred from the destination node to the source node based on the routing path indicated in the routing information stored in the second routing register.

12. The multi-chip processing system as claimed in claim 1, further comprising:
a third chip that is an intermediate node between the source node and the destination node, comprising a third interconnect bus, and a third microprocessor coupled to the third interconnect bus, wherein:
the packet output from the source node is transferred to the destination node through the intermediate node;
the third interconnect bus includes a third routing register storing the routing information carried in the header of the packet received by the intermediate node; and
the third microprocessor modifies an effective bit number of the routing path indicated in the routing information to note transfer progress, and updates the modified routing information to the header of the packet to be output from the intermediate node.

13. A method for packet routing within a multi-chip processing system, comprising:
   managing a first routing register of a first interconnect bus of a first chip;
   operating the first chip as a source node to output a packet to be transferred to a destination node; and
   writing routing information that indicates a routing path from the source node to the destination node into the first routing register, and then loading the routing information from the first routing register to a header of the packet,
   wherein while being transferred within the multi-chip processing system from the source node to the destination node, the packet is guided along the routing path indicated in the routing information carried in the header of the packet.

14. The method for packet routing within a multi-chip processing system as claimed in claim 13, wherein:
   the first interconnect bus has a storage space storing a routing table;
   the routing table lists routing paths from the source node to the other nodes in the multi-chip processing system;
   a first bit of the routing information indicates whether the routing path indicated in the routing information is fixed or dynamically arranged;
   if the routing path is fixed, the routing path indicated in the routing information is provided by that burned in the routing table based on a preset architecture of the multi-chip processing system;
   if the routing path is dynamically arranged, the routing path indicated in the routing information is provided by that established in the routing table by scanning a real architecture of the multi-chip processing system when the multi-chip processing system is powered on.

15. The method for packet routing within a multi-chip processing system as claimed in claim 13, wherein:
   the routing information further indicates an effective bit number for the routing path indicated in the routing information; and
   the effective bit number is modified along with a transfer of the packet within the multi-chip processing system to note transfer progress.

16. The method for packet routing within a multi-chip processing system as claimed in claim 13, further comprising:
   when the packet output by the source node carries a request, evaluating whether a completion element corresponding to the request needs to be returned along the same route, and showing the evaluated result in a second bit of the routing information,
   wherein as indicated in the second bit of the routing information, the destination node determines whether to return the completion element to the source node along the same route.

17. The method for packet routing within a multi-chip processing system as claimed in claim 16, wherein:
   the routing path indicated in the routing information indicates output port information of intermediate nodes;
   the output port information indicates that for each intermediate node an output port is determined by clockwise or counterclockwise counting starting from an input port; and
   a third bit of the routing information indicates whether to adopt clockwise counting or counterclockwise counting.

18. The method for packet routing within a multi-chip processing system as claimed in claim 17, wherein:
   when identifying that the second bit of the routing information indicates returning the completion element to the source node along the same route, the destination node reverses the third bit of the routing information.

19. The method for packet routing within a multi-chip processing system as claimed in claim 18, wherein:
   the routing path indicated in the routing information further indicates a port number of an output port of the source node; and
   the routing path indicated in the routing information further indicates a port number of an input port of the destination node.

* * * * *